United States Patent [19]

Haag

[11] 4,280,362
[45] Jul. 28, 1981

[54] PEAK READING BOTTOM HOLE PRESSURE INSTRUMENT

[75] Inventor: James W. Haag, Marrero, La.

[73] Assignee: Texaco Inc., White Plains, N.Y.

[21] Appl. No.: 99,678

[22] Filed: Dec. 3, 1979

[51] Int. Cl.³ .................................................. G01L 7/16
[52] U.S. Cl. ....................................... 73/709; 73/151; 73/744
[58] Field of Search ........................... 73/151, 709, 744

[56] References Cited

U.S. PATENT DOCUMENTS

| 2,611,267 | 9/1952 | Pennington | 73/744 |
| 3,245,259 | 4/1966 | Werbowetzki | 73/709 |

Primary Examiner—Donald O. Woodiel
Attorney, Agent, or Firm—Carl G. Ries; Robert A. Kulason; Henry C. Dearborn

[57] ABSTRACT

A simplified downhole pressure reading instrument. It has a cylindrical body which holds a charge of gas at one end. There is a concentric cylindrical element which slides longitudinally inside the body with a low friction seal between them. The body has an opening at the other end from the gas charge, to admit the downhole fluid pressure. And, there is an arrangement for taking a reading of the maximum compression of the gas charge by the longitudinal movement of the inner cylindrical element.

2 Claims, 2 Drawing Figures

U.S. Patent   Jul. 28, 1981   4,280,362
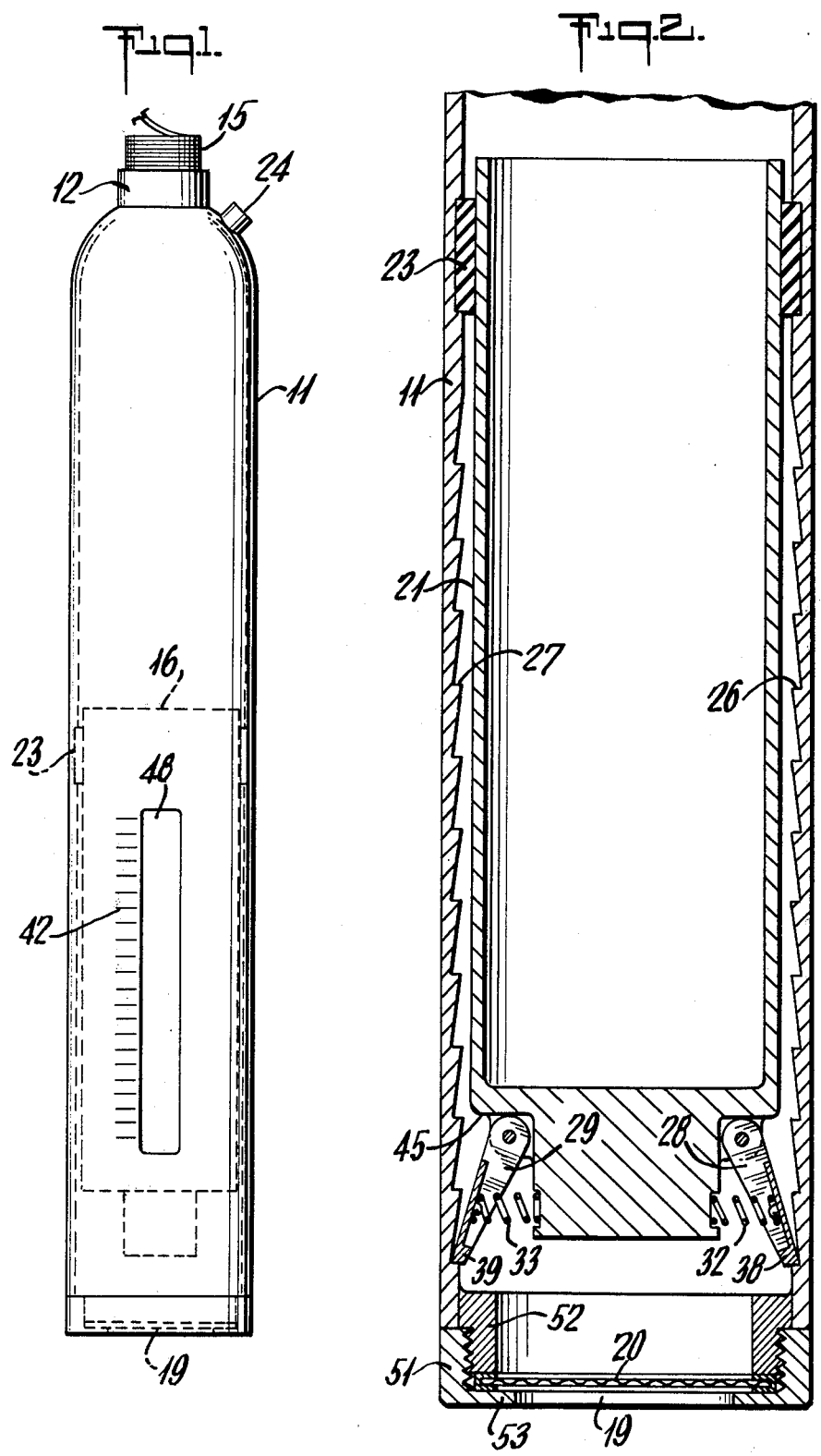

PEAK READING BOTTOM HOLE PRESSURE INSTRUMENT

BACKGROUND OF THE INVENTION

1. Field of the Invention

This invention concerns a pressure reading instrument that is particularly adapted for making measurements of pressure down in a borehole.

2. Description of the Prior Art

In the past there have been a number of proposals for instruments to measure pressure in boreholes, particularly oil wells and the like. However, all such known instruments are relatively complex and therefore somewhat delicate even though perhaps more accurate than a pressure instrument according to this invention. In addition, none of the known borehole pressure measuring instruments have the capability of making a maximum pressure reading without involving the use of a time recording arrangement such that the record is taken over the period of time during which the instrument is in the borehole. Clearly, the use of such time records includes an instrumentality that is relatively delicate and expensive. Examples of known borehole pressure measuring instruments may be found in the following five U.S. Pat. Nos. 1,969,141, McDonald, Aug. 7, 1934; 2,223,913, Johnston, Dec. 3, 1940; 2,611,267, Pennington, Sept. 23, 1952; 3,051,004, Hugel, Aug. 28, 1962; and 3,301,064, Kisling III, Jan. 31, 1967.

Consequently, it is an object of this invention to provide a simple yet effective peak reading downhole pressure instrument, which may be employed for rapid measurements in an inexpensive manner.

SUMMARY OF THE INVENTION

Briefly, the invention concerns a peak reading bottom hole pressure instrument, which comprises a cylindrical body member adapted for being lowered into a borehole having fluid under pressure therein. And it comprises a concentric cylindrical element inside said body member and adapted for longitudinal movement therein. It also comprises means for providing a low friction seal between the inside of said body member and the outside of said concentric element, and means for holding a gas under pressure in one end of said body member. It also comprises means for admitting said borehole fluid into said body member at the other end, in opposition to said gas pressure, whereby said concentric element will move longitudinally to equalize said borehole pressure.

Once more briefly, the invention concerns a peak reading bottom hole pressure instrument which comprises in combination, a cylindrical body member having attachment means at one end for lowering it into a borehole. And, it comprises a concentric cylindrical element inside said body member, and adapted for longitudinal movement therein. The said element has a hollow interior, open at one end, to form part of a chamber to hold gas under pressure at one end of said body member. The instrument also comprises a low friction seal between the inside of said body member and the outside of said concentric cylindrical element, and check valve means for charging said one end of said body member with said gas under pressure. It also comprises a ratchet for restricting said longitudinal movement toward said one end of said body member to compress said gas and to hold a maximum indication of said compression, and an open end at the other end of said body member. Said open end has a screen thereacross to hold out solids. It also comprises a scale marked on the outside of said body member, and a position mark on said cylindrical element located for moving adjacent to said scale. It also comprises a removable panel on said body member adjacent to said scale and over the path of movement of said position mark, in order to read the maximum pressure after removal of said instrument from the hole.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a side elevation showing an instrument according to the invention; and FIG. 2 is an enlarged longitudinal cross-section showing the lower portion of the instrument illustrated in FIG. 1.

DESCRIPTION OF THE PREFERRED EMBODIMENT

In oil and gas well drilling and producing procedures, there are many times when a simple rugged pressure measuring instrument would be very useful. After a well goes off production, a wire line check to determine whether the perforations are open or plugged might be simply carried out with no special equipment. Also, there are many times when a reservoir evaluation could be carried out which is not done, primarily because of the expense in running the conventional type of survey. On the other hand, an instrument according to this invention is rugged and simple, and the use is straightforward with no more than a so-called "slick line" operation needed for running the instrument down into the hole.

Referring to the drawing figures, it will be observed that there is a cylindrical body member 11 which is preferably a steel housing on the order of about twelve feet long. There is a rope socket 12 that provides an attachment for a so-called slick line 15, by means of which the tool 11 will be lowered into the hole (not shown). There is a concentric cylindrical element 16 that slides longitudinally inside the body 11, under the opposing influences of gas pressure from the upper end (as viewed in FIG. 1) of the body 11, against the fluid pressure of the borehole. Borehole pressure is transmitted through an open end 19 of the body 11. And, there is a screen 20 positioned or mounted in the opening 19 for eliminating solid particles such as rust or the like.

The cylindrical element 16 has a polished metal surface 21 on the outside thereof. And, there is a low friction seal 23 that maintains separation of a gas charge (not shown) in the upper end of the body 11, and the fluid pressure which is transmitted through the open end 19.

There is a lug 24 which contains a check valve (not shown), and which has a passageway (not shown) for admitting a charge of pressured gas into the interior at the upper end of the body 11.

There are a pair of ratchets indicated. These are for limiting the longitudinal movement of the inner cylindrical element 16 for movement only toward the upper end (as viewed in the drawings) of the body 11. Such movement is in compression of the gas charge therein. Two of such ratchets are shown in FIG. 2.

It may be noted that there are ratchet teeth 26 and 27 that act in conjunction with a pair of hinged arms 28 and 29. Arms 28 and 29 have springs 32 and 33, respectively, which urge them radially outward about the pivots thereof. Consequently, tips 38 and 39 of the arms 28 and 29, respectively, are urged into contact with the ratchet teeth 27 and 26. It will be appreciated that the arms 28 and 29 might be constructed with additional elements (not shown) for engaging more than one of the ratchet teeth 27 and 26, at a time. This would be structured along the lines of what oil well tool terminology designates as "slips".

There is a scale 42 marked on the outside of the body 11, longitudinally and near the end toward the opening 19. This will provide an indication which may be calibrated, for determining the maximum bottom hole pressure as measured by the instrument. A reading will be made by noting the position (along the scale markings 42) of a bottom edge 45 of the inner cylindrical element 16 after the instrument has been brought back to the surface. There is a removable panel 48 on the body 11 which panel is situated adjacent to the scale 42. It is used to determine the maximum pressure reading after the instrument has been removed from the hole. The screen 20 may, of course, be held in place in any feasible manner. For example, there is an internally threaded ring 51 that screws onto a threaded extension 52 at the bottom of the body 11, so that the screen 20 is clamped between a lip 53 of the ring 51 and the outer edge of the extension 52.

OPERATION

In operation, the instrument is very simply employed by first having charged the upper portion of the body 11 with a compressed gas, e.g. nitrogen, under a predetermined pressure. Such pressure is chosen so as to have the range of instrument indications applicable to an expected downhole pressure that is to be measured. Such range, of course, depends upon physical dimensions and expected downhole temperature.

The gas under pressure having been charged into the housing 11 through the passage in the lug 24, then acts on the inner cylindrical element 16 tending to push it downward (as viewed in the drawings) into the lowermost position (which is illustrated in FIG. 2). Now, when the instrument is lowered into a borehole, and the pressure therein exceeds the pressure of the gas in the upper part of body 11, the inner element 16 will move longitudinally upward to equalize the pressure by compressing the gas. The pressure of the well fluid is transmitted into the lower end of the body 11 through the opening 19 and screen 20.

When the instrument is removed from the well, the maximum reading which was obtained will be maintained by the ratchet structure. And then, following removal of the instrument, the panel 48 will be taken out and the location of the edge 45 opposite the scale markings 42 will be noted. This is an indication of the maximum pressure to which the instrument was subjected. Of course, the cylindrical element 16 will be reset after each use. And, it will be appreciated that any feasible manner of retracting the spring biased arms 28 and 29 may be employed.

It will be appreciated that a separate index mark (not shown) might be employed on the inner cylindrical element 16 instead of using the edge 45 for the instrument readings.

It will also be appreciated that the instrument according to this invention is relatively simple in structure and rugged in construction. Consequently it provides an instrument that is easy to use and inexpensive in operation which should find many uses in oil and gas well operations in particular.

While a particular embodiment of the invention has been described above in considerable detail in accordance with the applicable statutes, this is not to be taken as in any way limiting the invention, but merely as being descriptive thereof.

I claim:

1. Peak reading bottom hole pressure instrument, comprising in combination
   a cylindrical body member having attachment means at one end for lowering it into a borehole,
   a concentric cylindrical element inside said body member, adapted for longitudinal movement therein,
   said element having a hollow interior open at one end to form part of a chamber to hold gas under pressure at one end of said body member,
   a low friction seal between the inside of said body member and the outside of said concentric cylindrical element,
   check valve means for charging said one end of said body member with said gas under pressure,
   a ratchet for restricting said longitudinal movement toward said one end of said body member to compress said gas and to hold a maximum of said compression,
   an open end at the other end of said body member having a screen thereacross to hold out solids,
   a scale marked on the outside of said body member,
   a position mark on said cylindrical element located for moving adjacent to said scale, and
   a removable panel on said body member adjacent to said scale and over the path of movement of said position mark in order to read the maximum pressure after removal of said instrument from the hole.

2. Peak reading bottom hole pressure instrument, comprising
   an open ended cylindrical body member adapted for being lowered into a borehole having fluid under pressure therein,
   a concentric cylindrical element having a hollow interior open at one end toward the interior of said cylindrical body member and adapted for longitudinal movement therein,
   means for providing a low friction seal between the inside of said body member and the outside of said concentric element,
   means for holding a gas under pressure in one end of said body member,
   ratchet means for restricting said concentric element longitudinal movement to compression only of said gas for holding a maximum indication of said borehole fluid pressure,
   said open end on said body member being adapted for admitting said borehole fluid into said body member at the other end in opposition to said gas pressure whereby said concentric element will move longitudinally to equalize said borehole pressure,
   a scale on the outside of said body member, and
   removable panel means for determining said maximum indication by reading the location of said concentric element relative to said scale.

* * * * *